United States Patent
Amagasa

(10) Patent No.: US 7,262,528 B2
(45) Date of Patent: Aug. 28, 2007

(54) MOTOR UNIT INCLUDING INTEGRATED MOTOR AND SPEED REDUCTION MECHANISM

(75) Inventor: Toshiyuki Amagasa, Nitta-gun (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 10/533,196

(22) PCT Filed: Sep. 5, 2003

(86) PCT No.: PCT/JP03/11335

§ 371 (c)(1),
(2), (4) Date: Apr. 28, 2005

(87) PCT Pub. No.: WO2004/042898

PCT Pub. Date: May 21, 2004

(65) Prior Publication Data

US 2005/0280323 A1  Dec. 22, 2005

(30) Foreign Application Priority Data

Nov. 5, 2002 (JP) .............................. 2002-320741

(51) Int. Cl.
*H02K 11/00* (2006.01)
*H02K 7/06* (2006.01)

(52) U.S. Cl. .................... 310/68 R; 310/71; 310/83

(58) Field of Classification Search ............ 310/68 R, 310/71, 89, 83, 64
See application file for complete search history.

(56) References Cited

U.S. PATENT DOCUMENTS

| | | | | |
|---|---|---|---|---|
| 4,712,030 A | * | 12/1987 | Lakin et al. ................. | 310/89 |
| 4,724,347 A | * | 2/1988 | Reinhardt et al. ........ | 310/68 R |
| 4,795,867 A | * | 1/1989 | Ohi et al. ................. | 200/37 R |
| 5,194,769 A | * | 3/1993 | Ade et al. ................. | 310/51 |
| 5,315,194 A | * | 5/1994 | Brusasco et al. .......... | 310/68 R |
| 5,632,469 A | * | 5/1997 | Heun et al. ................. | 254/267 |
| 5,723,924 A | * | 3/1998 | Blanchet ................... | 310/85 |
| 5,954,258 A | * | 9/1999 | Baader et al. ............. | 226/188 |
| 5,994,807 A | * | 11/1999 | Coles et al. ............. | 310/83 |

(Continued)

FOREIGN PATENT DOCUMENTS

EP  0 252 481  1/1988

(Continued)

*Primary Examiner*—Burton Mullins
*Assistant Examiner*—Erik Preston
(74) *Attorney, Agent, or Firm*—Wenderoth, Lind & Ponack, L.L.P.

(57) ABSTRACT

In a motor unit integrating a motor and a drive control section, the drive control section has a stack structure in which two circuit component containing sections are arranged three-dimensionally with a bus bar being arranged between both containing sections. A printed wiring board on which signal system circuit components, e.g., a rotation sensor and a position sensor, are mounted is arranged in the first circuit component containing section. Power system circuit components, e.g., a FET and a relay, are arranged in the second circuit component containing section. The power system circuit components are mounted directly on the bus bar and are arranged substantially in parallel with the printed wiring board, with the bus bar interposed therebetween. The circuit component containing section is arranged on the outer surface side of the unit with respect to the circuit component containing section, and a heat sink is fixed to the outside thereof.

30 Claims, 6 Drawing Sheets

U.S. PATENT DOCUMENTS

| | | | |
|---|---|---|---|
| 6,081,056 A * | 6/2000 | Takagi et al. | 310/89 |
| 6,700,253 B1 * | 3/2004 | Ohnuma et al. | 310/89 |
| 6,707,185 B2 * | 3/2004 | Akutsu et al. | 310/71 |
| 6,756,711 B2 * | 6/2004 | Matsuyama et al. | 310/68 R |
| 6,998,741 B2 * | 2/2006 | Breynaert et al. | 310/68 B |
| 2002/0060105 A1 * | 5/2002 | Tominaga et al. | 180/443 |
| 2003/0084677 A1 * | 5/2003 | Kagaya et al. | 62/259.2 |
| 2003/0094920 A1 * | 5/2003 | Numaguchi et al. | 318/801 |
| 2004/0232786 A1 * | 11/2004 | Fukazawa et al. | 310/89 |

FOREIGN PATENT DOCUMENTS

| | | |
|---|---|---|
| JP | 5-90776 | 4/1993 |
| JP | 07075315 A * | 3/1995 |
| JP | 10-93207 | 4/1998 |
| JP | 10-93208 | 4/1998 |
| JP | 2000-87643 | 3/2000 |
| JP | 2001-95131 | 4/2001 |
| JP | 2002-165412 | 6/2002 |
| JP | 2002-252484 | 9/2002 |
| WO | WO 179787 A1 * | 10/2001 |

* cited by examiner

MOTOR UNIT INCLUDING INTEGRATED MOTOR AND SPEED REDUCTION MECHANISM

TECHNICAL FIELD

The present invention relates to a motor unit integrating a motor with a speed reduction mechanism or a control circuit. More particularly, the invention relates to a motor unit to be used as a drive source of, e.g., a wiper or slide door of an automobile.

BACKGROUND ART

Conventionally, in a windshield wiper unit for wiping the front glass of a car, a system that activates a wiper arm by a link mechanism with a motor used as a drive source has been widely employed. As the function of the wiper system becomes more refined, a system that electrically controls a motor to thereby control the wiper movement has widely appeared in recent years in place of the above link drive system. In this motor control drive system, a configuration in which a control circuit and motor are integrated with each other is adopted in terms of product modulation or the like. For example, as disclosed in PCT Application Laid-open Publication No. 2002-511038, a motor is mounted in an automobile as a unit including a speed reduction mechanism.

In such a motor unit, however, a control circuit section is two-dimensionally arranged in a housing, and circuit components are two-dimensionally placed on the control circuit section, thereby increasing an area occupied by the mounted circuit components. Further, in the control circuit section, power system components such as a power MOSFET and relay, are all arranged on the printed wiring board, so that the width of a copper-foil pattern must be widened on the printed wiring board according to the current amount, correspondingly increasing the board size. It is desirable that the power system components be arranged on the large-sized printed wiring board in consideration of the heat radiation properties thereof. Even in view of this, the board size tends to be increased. Accordingly, the size of the control circuit section is likely to be increased for these reasons to thereby increase the size of the motor unit. The larger the size of the motor unit, the larger the size of the required mounting space for the unit to be provided on the automobile side becomes, and this problem does need to be solved.

An object of the present invention is to reduce the space occupied by the control circuit section in the motor unit to reduce the size of the entire motor unit.

SUMMARY OF THE OF INVENTION

A motor unit according to the present invention integrally comprises a motor and a drive control section having a control circuit for driving the motor. The unit is characterized in that the drive control section includes: a first circuit component containing section; a second circuit component containing section three-dimensionally arranged with respect to the first circuit component containing section; and a connecting line arranged between the first and second circuit component containing sections.

In the present invention, the drive control section has a three-dimensional structure including the first and second circuit component containing sections, so that it is possible to arrange circuit components in a three-dimensional manner to reduce the planar size (area) of the drive control section and thereby to contain circuit components for motor drive control in the small space. Therefore, it is possible to reduce the size of the motor unit, as compared to a conventional motor unit, as well as to reduce the mounting space on the automobile side. Further, since the noise generated from the circuit components of the containing sections is absorbed by the connecting line, it is possible to obtain a motor having improved accuracy in responsiveness or the like.

In the motor unit, the first circuit component containing section may include a printed wiring board, and the second circuit component containing section may include circuit components electrically connected to the printed wiring board through the connecting line. Further, in the motor unit, the printed wiring board and the circuit components arranged in the second circuit component containing section may be arranged substantially in parallel with each other, with the connecting line interposed therebetween. With the above configuration, the circuit components can be arranged with improved space efficiency.

Further, in the motor unit, a configuration may be employed in which signal system circuit components are arranged in the first circuit component containing section and power system circuit components are arranged in the second circuit component containing section. With the above configuration, the amount of current flowing through the printed wiring board arranged in the first circuit component containing section can be reduced. The area of a copper-foil pattern can accordingly be reduced to reduce the size of the wiring board. In this case, the power system circuit components may directly be mounted on the connecting line.

In addition, in the motor unit, the second circuit component containing section may be arranged on the outer surface side of the unit with respect to the first circuit component containing section. With the above configuration, the power system circuit components can be arranged on the open air side. Therefore, the heat generated from the power system circuit components can effectively be radiated to the air. In this case, a configuration may be allowable in which a heat sink is provided outside the second circuit component containing section to further increase heat radiation properties.

Further, the motor unit may include the motor; a case frame which contains a speed reduction mechanism of the motor; and a cover assembly which is fitted to the case frame and contains the drive control section.

In this case, the cover assembly may have a two-chamber structure in which the first and second circuit component containing sections are arranged three-dimensionally in the upper and lower directions or may have a dividing wall that sections the first and second circuit component containing sections. Further, the dividing wall may have a connecting hole which communicates the first and second circuit component containing sections.

Further, the cover assembly may include: a bottom case which has the dividing wall, the first circuit component containing section being formed at the portion between the dividing wall, and the case frame; and a case cover which is fitted to the bottom case. In this case, the second circuit component containing section being formed between the case cover and the dividing wall.

In addition, the power system circuit components may be fixed to the inner surface of the case cover and the case cover may include a plurality of fins on the outer surface side thereof. Further, black alumite treatment may be applied to the outer side surface of the case cover, which is made of aluminum.

DETAILED DESCRIPTION OF THE INVENTION

Figure 1:
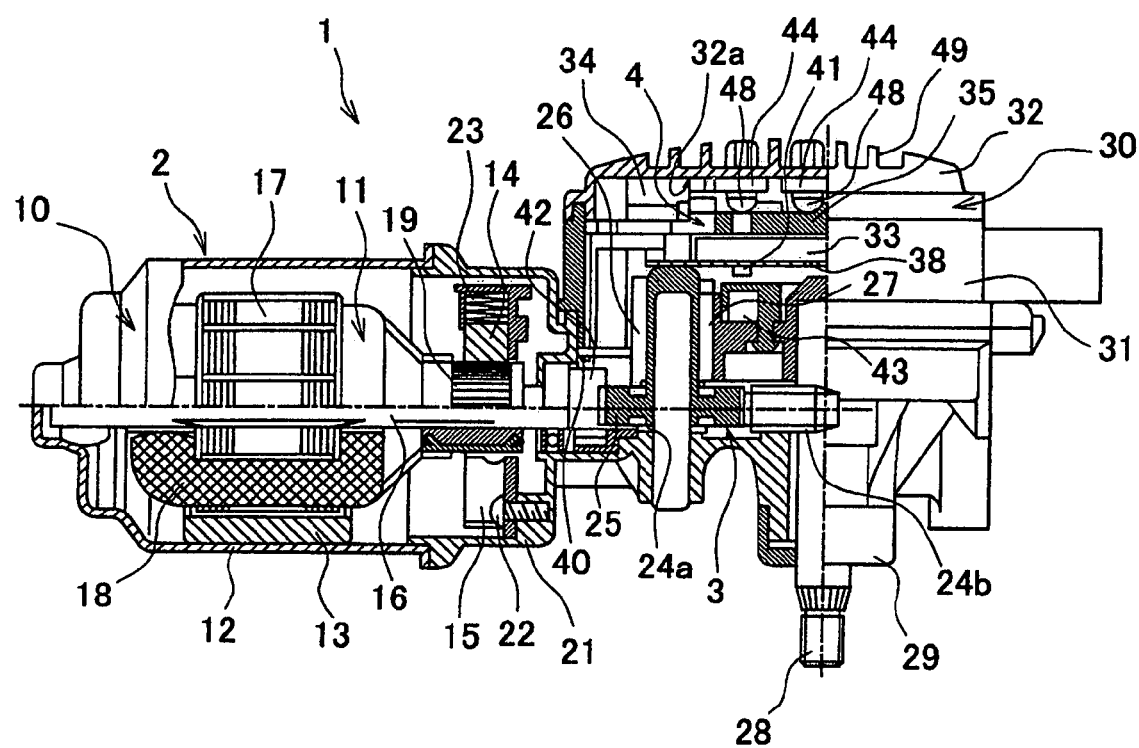
FIG. 1 is an explanatory view showing the configuration of a motor unit according to an embodiment of the present invention.

An embodiment of the present invention will be described below in detail with reference to the accompanying drawings. FIG. 1 is an explanatory view showing the configuration of a motor unit according to an embodiment of the present invention. A motor unit 1 of FIG. 1 is used as a drive source of a windshield wiper unit for an automobile and integrally includes an electric motor 2, a speed reduction mechanism section 3, and a drive control section 4. A rotation output of the electric motor 2 is decelerated in the speed reduction mechanism section 3 and drives a wiper mechanism (not shown).

The electric motor 2 is constituted by a stator 10 and a rotor 11. The stator 10 has a yoke 12 having a closed-bottomed cylindrical shape, a permanent magnet 13 fixed on the inner circumferential surface of the yoke 12, a brush 14, and a brush holder 15 which retains the brush 14. Provided on the rotor 11 side are a motor shaft 16 rotatably supported in the stator 10, an armature core 17 fixed to the motor shaft 16, a coil 18 wounded around the armature core 17, and a commutator 19 fixed to the motor shaft 16 at the lateral side of the armature core 17.

A case frame 21 is integrally attached to the edge portion of the yoke 12 on the opening side thereof. The brush holder 15 is fixed by a screw 22 to the lateral end portion of the case frame 21. The brush 14 is supported by the brush holder 15 so as to be movable in the inner and outer diameter directions thereof. The brush 14 is biased by a spring 23 toward the commutator 19 to be pressed against the commutator 19. The above basic structure is the same as that of a conventional motor commonly used.

The speed reduction mechanism section 3 is provided within the case frame 21. The speed reduction mechanism section 3 decelerates the rotation of the motor shaft 16 in order to output the rotation. The speed reduction mechanism section 3 is constituted by a gear-reduction mechanism and includes a worm 24, a worm-wheel 25, a first gear 26, and a second gear 27 to decelerate the rotation of the motor shaft 16, and includes a drive (output) shaft 28 to output the rotation. The distal end portion of the motor shaft 16 projects inside of the case frame 21 from the yoke 12, where a pair of worms 24a and 25b furnished with thread grooves running in the opposite directions to each other are formed. The worm 24a is engaged with the worm-wheel 25 rotatably supported in the bottom surface portion of the case frame 21. The worm 24b is engaged with another second worm-wheel (not shown) formed in pairs with the worm-wheel 25.

The first gear 26 having a small diameter is integrally and coaxially arranged with the worm-wheel 25. The first gear 26 is engaged with the second gear 27 having a large diameter. The second gear 27 is fixed to a base end of the drive (output) shaft 28 rotatably supported in the bottom surface portion of the case frame 21. A small-diameter first gear is also integrally formed with the second worm-wheel (not shown) and engaged with the second gear 27. The distal end opposite the base end of the drive (output) shaft 28 projects outward from the bottom portion of the case frame 21 and is linked to a wiper mechanism (not shown). A seal rubber 29 is attached to the bottom portion of the case frame 21 so as to cover the drive (output) shaft 28. The rotation of the motor shaft 16 is transmitted, while being decelerated, through the worms 24a and 24b, worm-wheel 25, second worm-wheel, first gear 26, first gear, and second gear 27, and reaches the drive (output) shaft 28 to activate the windshield wiper unit.

Figure 2:
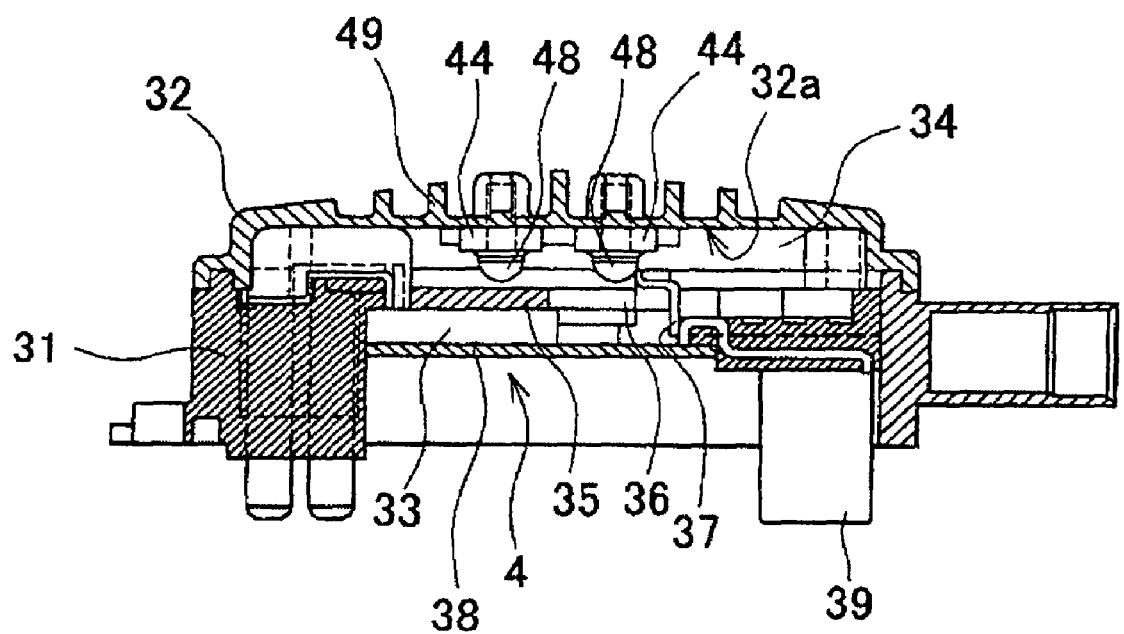
FIG. 2 is an explanatory view showing the internal configuration of a cover assembly.
Figure 3:
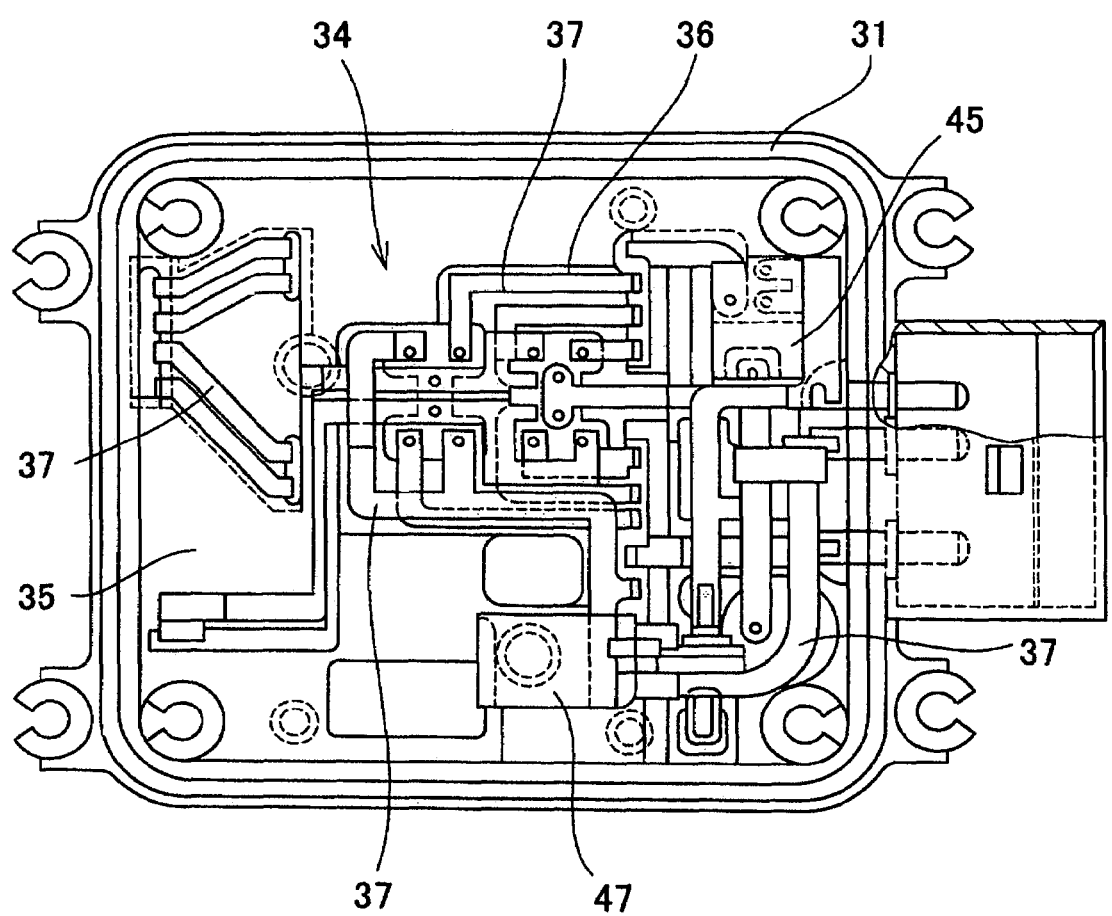
FIG. 3 is a plan view of a bottom case, viewed from above in FIG. 2, showing a state in which a heat sink has been removed from the bottom case.
Figure 4:
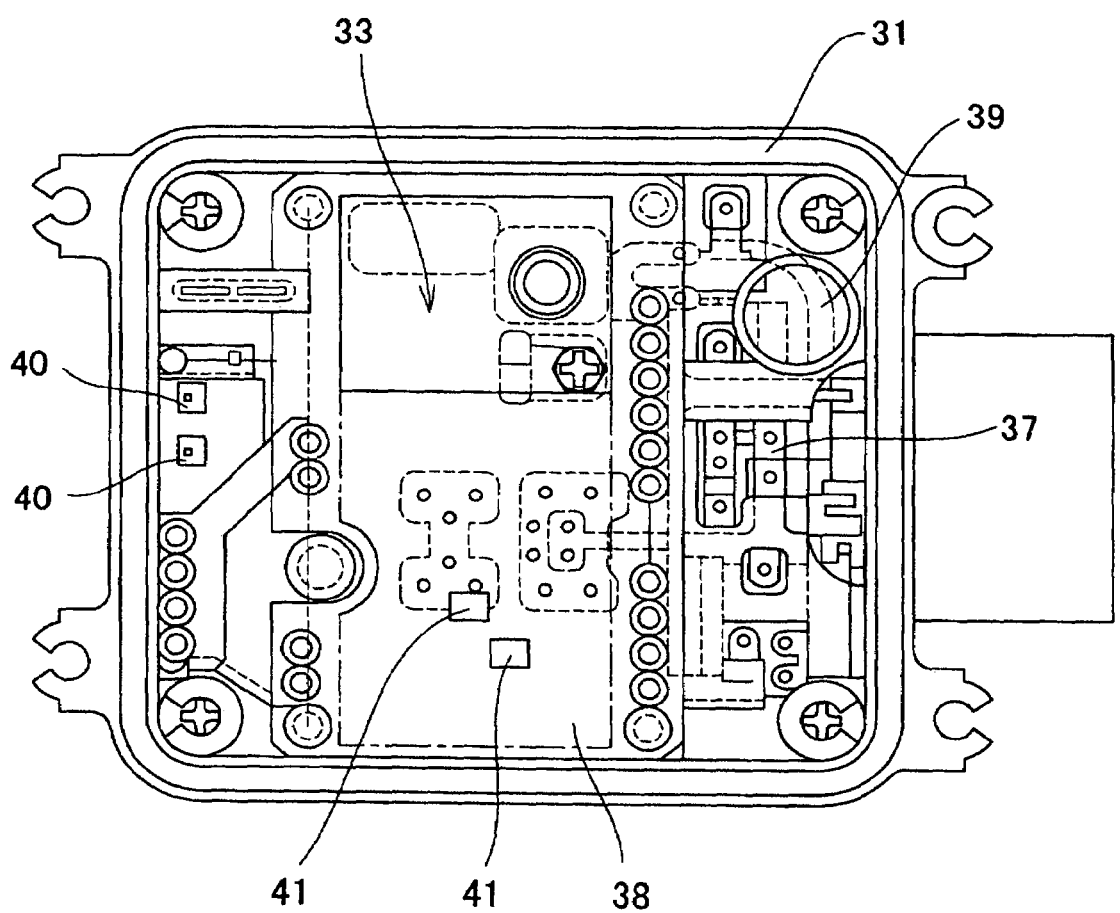
FIG. 4 is a bottom view of the bottom case, viewed from below in FIG. 2.
Figure 5:
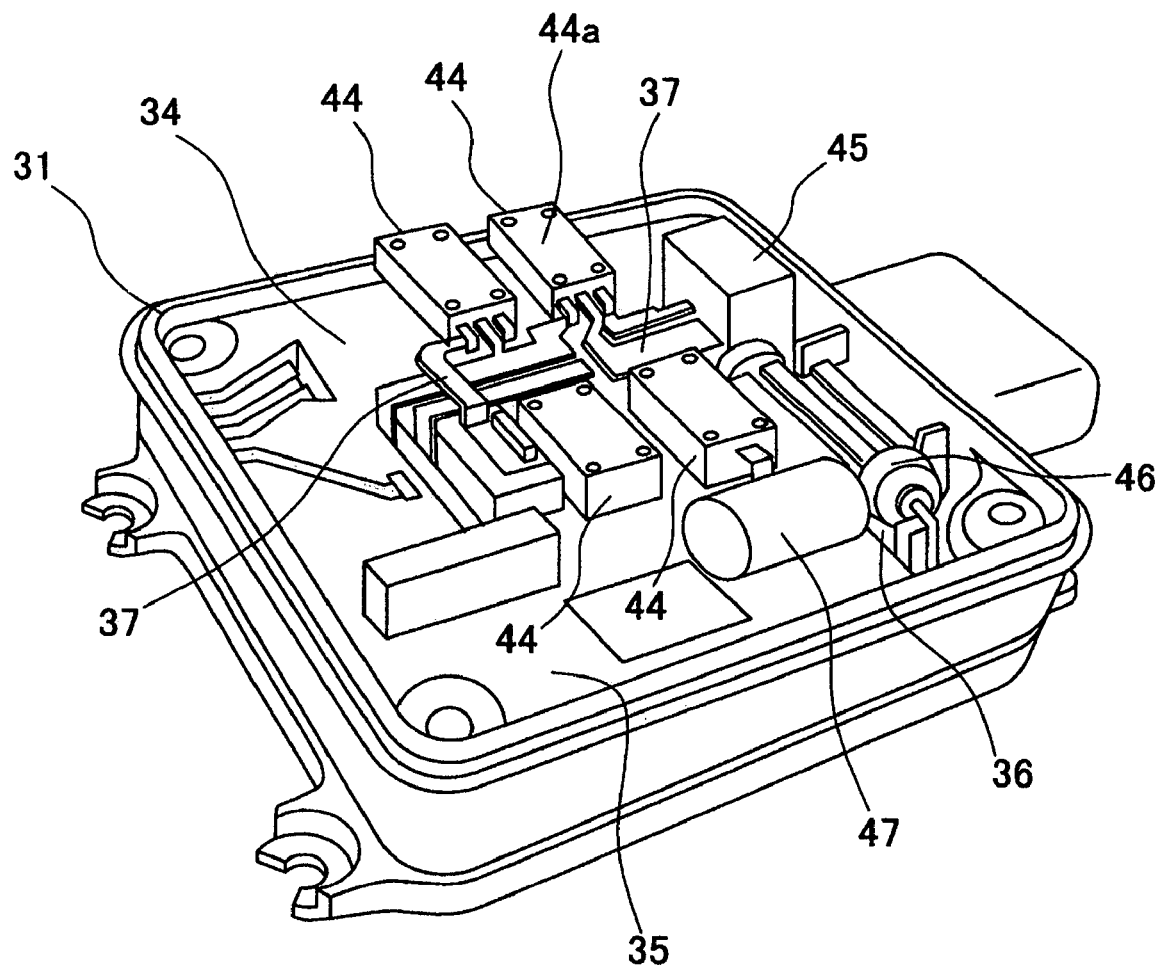
FIG. 5 is a perspective view of the bottom case, showing the upper surface side of the bottom case in FIG. 2.
Figure 6:
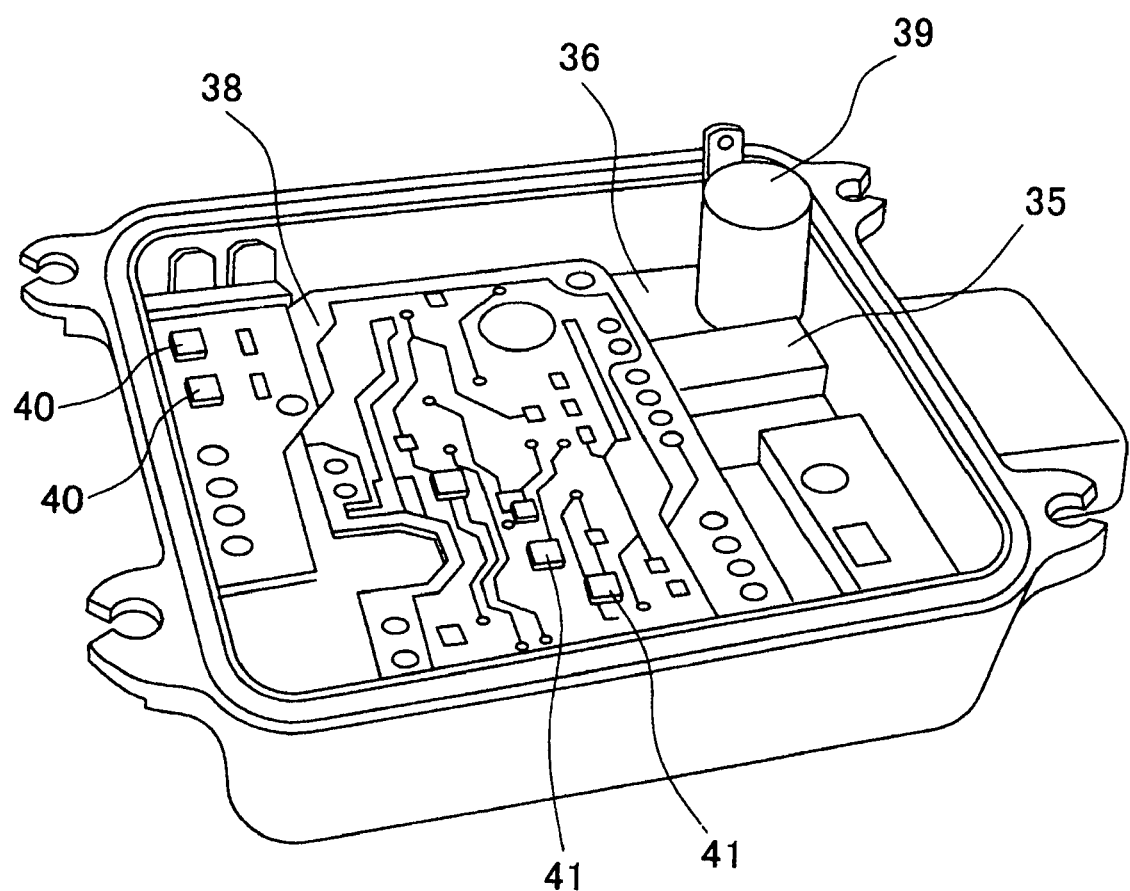
FIG. 6 is a perspective view of the bottom case, showing the lower side surface of the bottom case in FIG. 2.

A cover assembly 30 containing the drive control section 4 is provided on the upper side (in FIG. 1) of the case frame 21. FIG. 2 is an explanatory view showing the internal configuration of the cover assembly 30. The cover assembly 30 is constituted by a bottom case 31 made of synthetic resin, and a heat sink (case cover) 32 made of aluminum die-casting. FIG. 3 is a plan view of the bottom case 31, viewed from above in FIG. 2, showing a state in which the heat sink 32 has been removed from the bottom case 31. FIG. 4 is a bottom view of the bottom case 31, viewed from below in FIG. 2. FIGS. 5 and 6 are perspective views of the bottom case 31. FIG. 5 shows the upper surface side of the bottom case 31 in FIG. 2, and FIG. 6 shows the lower surface side of the bottom case 31 in FIG. 2.

The bottom case 31 has a two-chamber structure in which two circuit component containing sections 33 (first) and 34 (second) are arranged three-dimensionally in the upper and lower directions. A dividing wall 35 is formed between the upper and lower circuit component containing sections 33 and 34 to separate them from each other. As clearly shown in FIG. 1 both the first circuit component containing section 33 and the second circuit component containing section 34 are located above the output shaft 28 (i.e., above the base end of the output shaft 28). A connecting hole 36 which allows the containing sections 33 and 34 (to communicate) is appropriately formed in the dividing wall 35. A metal bus bar (connecting line) 37 is wired through the connecting hole 36 to electrically connect the containing sections 33 and 34. As shown in FIGS. 1 and 2, the first circuit component containing section 33 is arranged so as to face the speed reduction mechanism section 3 (i.e. is closest to output shaft 28), while the second circuit component containing section 34 faces the case cover (heat sink) 32 (i.e., is farthest from output shaft 28).

A printed wiring board 38 mounting signal system chip components, condenser 39, and the like are contained in the lower side circuit component containing section 33 (first circuit component containing section). Mounted on the printed wiring board 38 are a rotation sensor 40 which detects the rotation of the motor shaft 16, a position sensor 41 which detects the rotation angle of the drive shaft 28 to detect the position of wiper blades, and the like. A rotation detection sensor magnet 42 is attached to the motor shaft 16 so as to correspond to the rotation sensor 40 and thereby a pulse signal is output from the rotation sensor 40 when the motor shaft 16 is rotated. Further, a position detection sensor magnet 43 is attached to the second gear 27 so as to correspond to the position sensor 41 and thereby an absolute position (e.g., lower reversal position) of the wiper blades is detected by the potion sensor 41. In addition, by counting the pulse signal from the rotation sensor 40, it is possible to grasp the shift amount of the wiper blades from the absolute position thereof. As a result, the current position of the wiper blade can accurately be detected.

Contained in the upper side circuit component containing section 34 (second circuit component containing section) are power system circuit components such as a FET 44, relay 45, diode 46, and condenser 47. The bus bar 37 electrically connected to the printed wiring board 38 is wired in the second circuit component containing section 34. Discrete components such as the FET 44 are directly mounted on the bus bar 37. A broad metal plate is used for the bus bar 37 in accordance with the amount of current flowing in the power system circuit components. Respective bus bars 37 are fixed by epoxy based resin to be insulated with each other.

The heat sink 32 also serving as a cover is fitted to the upper surface of the bottom case 31. The FET 44 is fixed by a screw 48 to the inner surface of the heat sink 32. The upper surface 44a of the FET 44 directly comes into contact with the inner surface 32a of the heat sink 32. A plurality of fins 49 are formed on the outer surface side of the heat sink 32. The heat generated in the FET 44 is directly transmitted to the heat sink 32, passed through the fins 49 and the like, and is immediately radiated from the outer surface of the heat sink 32. Incidentally, black alumite treatment has been applied to the heat sink 32 in order to increase heat radiation properties.

As described above, the bottom case 31 has a three dimensional two-chamber structure in which circuit components are arranged in a stacked manner, so that it is possible to reduce the planar size (area) of the drive control section 4 and thereby to contain circuit components for motor drive control in the small space. Therefore, it is possible to reduce the size of the motor unit, as compared to a conventional motor unit, as well as to reduce the mounting space on the automobile side. Further, in the bottom case 31, the printed wiring board 38 and discrete components such as the FET 44 are arranged substantially in parallel with each other, with the bus bar 37 interposed therebetween, so that the circuit components are arranged with improved space efficiency in the bottom case 31.

Further, when the bus bar 37 is wired to allow the containing sections 33 and 34 to communicate, the power system circuit components are mounted on the bus bar 37, and only the signal system circuit components are mounted on the printed wiring board 38. Therefore, the amount of current flowing through the wiring board can be reduced. As a result, the area of a copper-foil pattern on the wiring board can be reduced, correspondingly miniaturizing the wiring board size. Therefore, combined with the two-chamber structure, it is possible to further reduce the size of the motor unit. Further, since the noise generated from the circuit components of the containing sections 33 and 34 is absorbed by the bus bar 37, it is possible to improve responsiveness or the like to increase motor control accuracy.

On the other hand, in the drive control section 4, the signal system sensor components are arranged in the motor shaft 16 side circuit component containing section 33, and the power system circuit components are arranged in the circuit component containing section 34 positioned on the outer surface side of the bottom case 31. That is, the power system circuit components are arranged in the open air side, so that the heat generated from the power system circuit components can effectively be radiated to the air. Further, the heat sink 32, which serves also as a cover of the bottom case 31, is provided on the rear side of the power system circuit components, so that heat radiation properties can further be increased.

As described above, according to the present invention, in the motor unit integrating a motor and drive control section, the drive control section has a three-dimensional structure including a first and second circuit component containing sections, the containing sections being connected to each other by a connecting line. Therefore, it is possible to arrange circuit components in a three-dimensional manner to reduce the planar size (area) of the drive control section and thereby to contain circuit components for motor drive control in the small space. Therefore, it is possible to reduce the size of the motor unit, as compared to a conventional motor unit, and to reduce the mounting space on the automobile side. Further, since the noise generated from the circuit components of the containing sections is absorbed by the connecting line, it is possible to obtain a motor having improved accuracy in responsiveness or the like.

Further, according to the motor unit of the present invention, a printed wiring board arranged in the first circuit component containing section and circuit components arranged in the second circuit component containing section are arranged substantially in parallel with each other, with the connecting line interposed therebetween. Thus, the circuit components can be arranged with improved space efficiency. As a result, it is possible to reduce the size of the entire motor unit.

Further, according to the motor unit of the present invention, signal system circuit components are arranged in the first circuit component containing section and the power system circuit components are arranged in the second circuit component containing section, so that the amount of current flowing through the printed wiring board arranged in the first circuit component containing section can be reduced. Accordingly the area of a copper-foil pattern on the wiring board can be reduced according to the current amount to reduce the size of the wiring board, thereby miniaturizing the motor unit.

In addition, according to the motor unit of the present invention, the second circuit component containing section is arranged in the open air side of the unit with respect to the first circuit component containing section, so that the power system circuit components can be arranged on the open air side. Therefore, the heat generated from the power system circuit components can effectively be radiated to the air. Further, a heat sink is provided outside the second circuit component containing section, so that heat radiation properties can be further increased.

It goes without saying that the present invention is not limited to the above embodiment, and various changes may be made without departing from the scope of the invention.

For example, not only the signal system circuit components, but also the power system circuit components can appropriately be mounted on the printed wiring board 38. Further, in the above embodiment, the bottom case 31 has a three-dimensional two-chamber structure. Alternatively, however, the bottom case 31 may have a three-dimensional three or more-chamber structure. Further, a chamber like mezzanine may be provided in the bottom case 31.

Further, in the above embodiment, the motor unit of the present invention is used as a drive source of a windshield wiper unit. Alternatively, however, the motor unit according to the present invention is also applicable to a drive source of a car tailgate, slide door, power window, sunroof, and the like. In addition, the motor unit of the present invention is applicable not only to an automobile, but to various types of electric apparatus that uses a motor as a drive source. While the motor unit includes the speed reduction mechanism section 3 in the above embodiment, the present invention can be applied to the motor unit that does not include the speed reduction mechanism section 3.

INDUSTRIAL APPLICABILITY

As described above, the motor unit according to the present invention is effectively applied not only to a motor unit used as a drive source of, e.g., a windshield wiper or slide door of an automobile, but also to a drive source of various electric apparatus, such as a motor unit used for the portion the size of which needs to be reduced.

The invention claimed is:

1. A motor unit comprising:
   a motor including a speed reduction mechanism, said speed reduction mechanism including an output shaft having a base end and a distal end opposite said base end and projecting outward from a main section of said speed reduction mechanism;
   a case frame containing said speed reduction mechanism;
   a cover assembly fitted to an upper side of said case frame and containing a drive control section having a control circuit for driving said motor, said drive control section including:
      a first circuit component containing section arranged at said base end of said output shaft along a longitudinal axis of said output shaft, said first circuit component containing section including a printed wiring board and containing signal system circuit components;
      a second circuit component containing section arranged at said base end of said output shaft along the longitudinal axis of said output shaft and farther from said base end than said first circuit component containing section, said second circuit component containing section containing power system circuit components, said first circuit component containing section and said second circuit component containing section being arranged in a three-dimensional manner so as to be stacked one above the other with respect to an upper and lower direction, and so as to be located at an upper side of said speed reduction mechanism; and
      a metal bus bar arranged between said first circuit component containing section and said second circuit component containing section so as to electrically connect said signal system circuit components to said power system circuit components, said power system circuit components being mounted directly on said metal bus bar, only said signal system circuit components being mounted on said printed wiring board, and said metal bus bar being operable to absorb noise generated by said power system circuit components and said signal system circuit components.

2. The motor unit according to claim 1, wherein said printed wiring board and said power system circuit components in said second circuit component containing section are arranged substantially in parallel with each other, said metal bus bar being interposed between said printed wiring board and said power system circuit components.

3. The motor unit according to claim 1, further comprising a printed wiring board arranged in said second circuit component containing section, an area of a copper-foil pattern of said wiring board arranged in said first circuit component containing section being smaller than an area of a copper-foil pattern of said wiring board arranged in said second circuit component containing section.

4. The motor unit according to claim 1, wherein said second circuit component containing section is located on an upper side of said first circuit component containing section.

5. The motor unit according to claim 1, further comprising a heat sink at an outer and upper side of said second circuit component containing section.

6. The motor unit according to claim 1, wherein said cover assembly has a two-chamber structure including a first chamber comprising said first circuit component containing section and a second chamber comprising said second circuit component containing section.

7. The motor unit according to claim 6, wherein said cover assembly includes a dividing wall separating said first circuit component containing section from said second circuit component containing section.

8. The motor unit according to claim 1, wherein said cover assembly includes a dividing wall separating said first circuit component containing section from said second circuit component containing section.

9. The motor unit according to claim 8, wherein said dividing wall has a connecting hole for allowing said first circuit component containing section to communicate with said second circuit component containing section.

10. The motor unit according to claim 9, wherein said cover assembly further includes:
    a bottom case having said dividing wall, said first circuit component containing section being located between said dividing wall and said case frame; and
    a case cover fitted to said bottom case, said second circuit component containing section being located between said case cover and said dividing wall.

11. The motor unit according to claim 8, wherein said cover assembly further includes:
    a bottom case having said dividing wall, said first circuit component containing section being located between said dividing wall and said case frame; and
    a case cover fitted to said bottom case, said second circuit component containing section being located between said case cover and said dividing wall.

12. The motor unit according to claim 11, further comprising power system circuit components fixed to an inner surface of said case cover.

13. The motor unit according to claim 12, wherein said case cover has a plurality of fins on an outer surface thereof.

14. The motor unit according to claim 12, wherein said case cover is made of aluminum, and black alumite treatment is applied to an outer surface of said case cover.

15. The motor unit according to claim 11, wherein said case cover has a plurality of fins on an outer surface thereof.

16. The motor unit according to claim 15, wherein said case cover is made of aluminum, and black alumite treatment is applied to an outer surface of said case cover.

17. The motor unit according to claim 11, wherein said case cover is made of aluminum, and black alumite treatment is applied to an outer surface of said case cover.

18. The motor unit according to claim 1, wherein said first circuit component containing section includes a rotation sensor for detecting a rotation of a motor shaft of said motor.

19. The motor unit according to claim 1, wherein said first circuit component containing section includes a position sensor for detecting a rotation angle of a drive shaft of said speed reduction mechanism, said drive shaft being operable to output a decelerated rotation of said motor shaft.

20. A motor unit comprising:
    a motor including:

a yoke having a closed-bottom cylindrical shape;
a permanent magnet fixed on an inner circumferential surface of said yoke;
a motor shaft having a first end rotatably supported in said yoke;
an armature core fixed to said motor shaft;
a coil wound around said armature core;
a commutator fixed to said motor shaft and arranged adjacent to said armature core and electrically connected to said coil;
a brush in slide contact with said commutator; and
a brush holder for retaining said brush;
a speed reduction mechanism engaged with a worm of said motor shaft to decelerate a rotation of said motor shaft and to transfer the decelerated rotation to an output shaft, said output shaft having a base end and a distal end opposite said base end and projecting outward from a main section of said speed reduction mechanism;
a case frame connected to said yoke and containing said speed reduction mechanism; and
a cover assembly including:
  a bottom case having a first circuit component containing section arranged at said base end of said output shaft along a longitudinal axis of said output shaft, a second circuit component containing section arranged at said base end of said output shaft along the longitudinal axis of said output shaft and farther from said base end than said first circuit component containing section, a dividing wall arranged between said first circuit component containing section and said second circuit component containing section, said bottom case being arranged such that said first circuit component containing section faces said speed reduction mechanism;
  a case cover fitted to said bottom case and shaped to cover said second circuit component containing section;
  a printed wiring board in said first circuit component containing section;
  signal system circuit components in said first circuit component containing section, and only said signal system circuit components are mounted on said printed wiring board;
  power system circuit components in said second circuit component containing section for supplying an electric current to said motor from said signal system circuit components to drive said motor; and
  a metal bus bar electrically connecting said signal system circuit components to said power system circuit components, said power system circuit components being mounted directly on said metal bus bar, and said metal bus bar being operable to absorb noise generated by said power system circuit components and said signal system circuit components.

21. The motor unit according to claim 20, wherein said first circuit component containing section includes a rotation sensor for detecting the rotation of said motor shaft.

22. A motor unit comprising:
a motor including:
  a yoke having a closed-bottom cylindrical shape;
  a permanent magnet fixed on an inner circumferential surface of said yoke;
  a motor shaft having a first end rotatably supported in said yoke;
  an armature core fixed to said motor shaft;
  a coil wound around said armature core;
  a commutator fixed to said motor shaft and arranged adjacent to said armature core and electrically connected to said coil;
  a brush in slide contact with said commutator; and
  a brush holder for retaining said brush;
a speed reduction mechanism engaged with a worm of said motor shaft to decelerate a rotation of said motor shaft and to transfer the decelerated rotation to an output shaft, said output shaft having a base end and a distal end opposite said base end and projecting outward from a main section of said speed reduction mechanism;
a case frame connected to said yoke and containing said speed reduction mechanism;
a bottom case having a first circuit component containing section arranged at said base end of said output shaft along a longitudinal axis of said output shaft, a second circuit component containing section arranged at said base end of said output shaft along the longitudinal axis of said output shaft and farther from said base end than said first circuit component containing section, a dividing wall arranged between said first circuit component containing section and said second circuit component containing section, said bottom case being arranged such that said first circuit component containing section faces said speed reduction mechanism;
a case cover fitted to said bottom case so as to cover said second circuit component containing section; and
a cover assembly including:
  a printed wiring board in said first circuit component containing section;
  signal system circuit components in said first circuit component containing section, and only said signal system circuit components are mounted on said printed wiring board, said signal system circuit components including a position sensor;
  power system circuit components in said second circuit component containing section, said power system circuit components including a FET for supplying an electric current to said motor from said signal system circuit components in said first circuit component containing section to drive said motor; and
  a metal bus bar electrically connecting said signal system circuit components to said power system circuit components, said power system circuit components being mounted directly on said metal bus bar, and said metal bus bar being operable to absorb noise generated by said power system circuit components and said signal system circuit components.

23. The motor unit according to claim 22, wherein said signal system circuit component containing section includes a rotation sensor for detecting the rotation of said motor shaft.

24. The motor unit according to claim 22, wherein said case cover has a heat sink; and
said position sensor of said signal system circuit components is operable to detect a rotation angle of a drive shaft of said speed reduction mechanism, said signal system circuit components further including a rotation sensor for detecting the rotation of said motor shaft.

25. The motor unit according to claim 1, wherein said first circuit component containing section and said second circuit component containing section are arranged above said output shaft.

26. The motor unit according to claim 20, wherein said first circuit component containing section and said second circuit component containing section are arranged above said output shaft.

27. The motor unit according to claim 22, wherein said first circuit component containing section and said second circuit component containing section are arranged above said output shaft.

28. The motor unit according to claim 1, wherein said motor further includes a motor shaft, said output shaft of said speed reduction mechanism being arranged orthogonally with respect to said motor shaft.

29. The motor unit according to claim 20, wherein said output shaft of said speed reduction mechanism is arranged orthogonally with respect to said motor shaft.

30. The motor unit according to claim 22, wherein said output shaft of said speed reduction mechanism is arranged orthogonally with respect to said motor shaft.

* * * * *